(12) United States Patent
Bessant et al.

(10) Patent No.: US 12,256,778 B2
(45) Date of Patent: Mar. 25, 2025

(54) AEROSOL-GENERATING DEVICE WITH SEALED COMPARTMENT

(71) Applicant: Altria Client Services LLC, Richmond, VA (US)

(72) Inventors: Michel Bessant, Carouge (CH); Laurent Golay, La Tour-de-Peilz (CH); Omer Kesici, Renens (CH); Nikolaus Martin Ernest Wilhelm Ricketts, Geneva (CH); Laurent Seydoux, Gillarens (CH); Alain Tabasso, Essertines-sur-Yverdon (CH)

(73) Assignee: Altria Client Services LLC, Richmond, VA (US)

( * ) Notice: Subject to any disclaimer, the term of this patent is extended or adjusted under 35 U.S.C. 154(b) by 0 days.

(21) Appl. No.: 18/190,895

(22) Filed: Mar. 27, 2023

(65) Prior Publication Data

US 2023/0225399 A1     Jul. 20, 2023

Related U.S. Application Data

(63) Continuation of application No. 16/443,120, filed on Jun. 17, 2019, now Pat. No. 11,622,578, which is a (Continued)

(30) Foreign Application Priority Data

Jan. 7, 2016   (EP) ..................... 16150488

(51) Int. Cl.
*H05B 6/10*     (2006.01)
*A24F 40/40*    (2020.01)
(Continued)

(52) U.S. Cl.
CPC ............... *A24F 40/40* (2020.01); *G08B 6/00* (2013.01); *H05B 6/108* (2013.01); *A24F 40/10* (2020.01); *A24F 40/20* (2020.01); *H04W 4/80* (2018.02)

(58) Field of Classification Search
CPC .......... A24F 40/10; A24F 40/20; A24F 40/40; G08B 6/00; H04W 4/80; H05B 6/108
(Continued)

(56) References Cited

U.S. PATENT DOCUMENTS 2,082,165 A   6/1937   Van
2,322,714 A   6/1943   Kalischer
(Continued)

FOREIGN PATENT DOCUMENTS

CN   203646510 U   6/2014
CN   204015121 U   12/2014
(Continued)

OTHER PUBLICATIONS

Notice of Allowance dated Jan. 15, 2024 issued in corresponding Japanese Patent Application No. 2021-207776.
(Continued)

*Primary Examiner* — Quang T Van
(74) *Attorney, Agent, or Firm* — Harness, Dickey & Pierce, P.L.C.

(57) ABSTRACT

An aerosol-generating device may include a housing defining at least one internal compartment. The housing may be waterproof. The aerosol-generating device may further include a power supply, an electric heater, and/or a haptic feedback device. Each of the power supply, electric heater, and/or haptic feedback device may be positioned within one or more of the at least one internal compartment.

17 Claims, 2 Drawing Sheets

Related U.S. Application Data continuation of application No. 15/400,284, filed on Jan. 6, 2017, now Pat. No. 10,362,804, which is a continuation of application No. PCT/EP2016/081057, filed on Dec. 14, 2016.

(51) Int. Cl.
    *G08B 6/00*     (2006.01)
    *A24F 40/10*     (2020.01)
    *A24F 40/20*     (2020.01)
    *H04W 4/80*     (2018.01)
    *H05B 6/06*     (2006.01)

(58) Field of Classification Search
USPC ....... 219/628, 618, 634, 635, 667, 490, 494, 219/385, 510, 552, 534, 542, 553, 201, 219/209; 392/397, 395, 400, 404; 320/107, 108, 115; 131/329, 237
See application file for complete search history.

(56) References Cited

U.S. PATENT DOCUMENTS

| | | | |
|---|---|---|---|
| 4,877,989 | A | 10/1989 | Drews et al. |
| 5,316,505 | A | 5/1994 | Kipp |
| 5,542,410 | A | 8/1996 | Goodman et al. |
| 8,820,330 | B2 | 9/2014 | Bellinger et al. |
| 2007/0279002 | A1 | 12/2007 | Partovi |
| 2007/0283972 | A1 | 12/2007 | Monsees et al. |
| 2008/0072900 | A1 | 3/2008 | Kenyon et al. |
| 2009/0283103 | A1 | 11/2009 | Nielsen et al. |
| 2012/0126745 | A1 | 5/2012 | Partovi et al. |
| 2014/0103873 | A1 | 4/2014 | Partovi et al. |
| 2014/0224267 | A1 | 8/2014 | Levitz et al. |
| 2014/0305448 | A1 | 10/2014 | Zuber et al. |
| 2014/0366898 | A1 | 12/2014 | Monsees et al. |
| 2015/0020825 | A1 | 1/2015 | Galloway et al. |
| 2015/0136158 | A1 | 5/2015 | Stevens et al. |
| 2015/0238713 | A1* | 8/2015 | Cohen .................. A61M 11/042 128/200.14 |
| 2015/0245665 | A1 | 9/2015 | Memari et al. |
| 2015/0245669 | A1 | 9/2015 | Cadieux et al. |
| 2015/0282527 | A1 | 10/2015 | Henry, Jr. |
| 2015/0313284 | A1 | 11/2015 | Liu |
| 2015/0333561 | A1 | 11/2015 | Alarcon |
| 2015/0359263 | A1 | 12/2015 | Bellinger |
| 2016/0150825 | A1 | 6/2016 | Mironov et al. |

FOREIGN PATENT DOCUMENTS

| | | |
|---|---|---|
| CN | 105050434 A | 11/2015 |
| EA | 200702669 A1 | 4/2008 |
| EP | 2756859 A1 | 7/2014 |
| TW | 201538093 A | 10/2015 |
| WO | 2009/127401 A1 | 10/2009 |
| WO | 2013/025921 A1 | 2/2013 |
| WO | WO-2013/093469 A2 | 6/2013 |
| WO | 2014/125479 A1 | 8/2014 |
| WO | WO-2015/009838 A2 | 1/2015 |
| WO | WO-2015/131991 A1 | 9/2015 |
| WO | WO-2015/137815 A1 | 9/2015 |
| WO | WO-2015/175715 A1 | 11/2015 |
| WO | WO-2015/177257 A1 | 11/2015 |
| WO | WO-2015177044 A1 | 11/2015 |
| WO | WO-2015/197627 A1 | 12/2015 |
| WO | 2017/118553 A1 | 7/2017 |

OTHER PUBLICATIONS

Notice of Allowance dated Oct. 26, 2023 for corresponding Korean Patent Application No. 2018-7018416.
European Search Report for European Priority Application No. EP16150488 Dated Jun. 21, 2016.
International Search Report and Written Opinion dated Mar. 24, 2017 for International Application No. PCT/EP2016/081057.
International Preliminary Report of Patentability for corresponding Application No. PCT/EP2016/081057 dated Jul. 10, 2018.
Russian Office Action and Search Report for corresponding Application No. 2018128591, dated Mar. 27, 2020.
Taiwanese Office Action and Search Report for corresponding Application No. 106100019, dated May 7, 2020.
Russian Notice of Allowance for corresponding Application No. 2018128591, dated Jul. 13, 2020.
Chinese Office Action for corresponding Application No. 201680073242.0, dated Jul. 28, 2020.
Office Action dated Nov. 18, 2020 issued in corresponding Taiwanese Patent Application No. 106100019.
Office Action for corresponding Japanese Application No. 2018-535353 dated Nov. 9, 2020 and English translation.
Chinese Office Action for corresponding Application No. 201680073242.0, dated May 19, 2021.
Chinese Office Action for corresponding Application No. 201680073242.0 dated Nov. 2, 2021.
Japanese Notice of Allowance dated Nov. 22, 2021 corresponding to Japanese Patent Application No. 2018-535353.
Chinese Office Action dated Jan. 27, 2022 for corresponding Chinese Patent Application Publication No. 201680073242.0.
Office Action issued Jun. 23, 2022 in Chinese Application No. 201680073242.0.
European letter from the opponent dated Dec. 20, 2022 for corresponding European Patent No. 3399876.
Office action dated Jul. 14, 2022 for corresponding U.S. Appl. No. 16/443,120.
Office action dated Nov. 23, 2021 for corresponding U.S. Appl. No. 16/443,120.
JP OA dated Jun. 15, 2023 for corresponding Japanese Patent Application No. 2021-207776.
Canadian Office Action dated Jul. 20, 2023 for corresponding Canadian Patent Application No. 3006602.
European Interlocutory decision dated Mar. 10, 2023 issued in corresponding European Appln. No. 16819849.7.
European Commencement of appeal proceedings dated May 25, 2023 issued in corresponding European Appln. No. 16819849.7.
European Opponent's grounds of appeal Jul. 25, 2023 issued in corresponding European Appln. No. 16819849.7.
European Opponent's reply to appeal dated Dec. 6, 2023 issued in corresponding European Appln. No. 16819849.7.
European Opponent's letter dated May 28, 2024 issued in corresponding European AppIn. No. 16819849.7.
Hidy et al. 'The Dynamics of Aerocolloidal Systems' International Reviews in Aerosol Physics and Chemistry, vol. 1, 2021, pp. 1-420.
Canadian Office Action dated Sep. 11, 2024 issued in corresponding Canadian Application No. 3,006,602.
Notice of Opposition for European Application No. 16819849.7 dated Nov. 22, 2021.

* cited by examiner

AEROSOL-GENERATING DEVICE WITH SEALED COMPARTMENT

CROSS-REFERENCE TO RELATED APPLICATIONS

This is a continuation of U.S. application Ser. No. 16/443,120, filed Jun. 17, 2019, which is a continuation of U.S. application Ser. No. 15/400,284, filed Jan. 6, 2017, which is a continuation of PCT/EP2016/081057, filed on Dec. 14, 2016, and further claims priority to EP 16150488.1, filed on Jan. 7, 2016, the entire contents of each of which are incorporated herein by reference.

BACKGROUND

Field

Example embodiments relate to an aerosol-generating device comprising a waterproof housing, and aerosol-generating systems comprising the aerosol-generating device. At least some example embodiments are also applicable as an electrically operated aerosol-generating device.

Description of Related Art

One type of aerosol-generating system is an electrically operated aerosol-generating system. Known handheld electrically operated aerosol-generating systems typically comprise an aerosol-generating device comprising a battery, control electronics, and an electric heater for heating an aerosol-generating article designed specifically for use with the aerosol-generating device. In some systems, the aerosol-generating article comprises an aerosol-generating substrate, such as a tobacco rod or a tobacco plug, and the heater contained within the aerosol-generating device is inserted into or around the aerosol-generating substrate when the aerosol-generating article is inserted into the aerosol-generating device. In other electrically operated aerosol-generating systems, the aerosol-generating article may comprise a capsule containing an aerosol-generating substrate, such as loose tobacco.

Typically, an aerosol-generating device is reusable with a plurality of disposable or refillable aerosol-generating articles. Therefore, the purchase of an aerosol-generating device may represent a larger consumer investment when compared to the purchase of a single aerosol-generating article.

SUMMARY

An aerosol-generating device may comprise a housing defining at least one internal compartment. The housing may be waterproof with regard to the at least one internal compartment. A power supply may be positioned within the at least one internal compartment. In addition, an electric heater may be positioned within the at least one internal compartment. Furthermore, a haptic feedback device may be positioned within the at least one internal compartment.

An aerosol-generating system may comprise an aerosol-generating device and an aerosol-generating article. The aerosol-generating article may include a storage portion and an aerosol-forming substrate within the storage portion. The electric heater of the aerosol-generating device may be configured to heat the aerosol-forming substrate during an operation of the aerosol-generating system. For example, the housing of the aerosol-generating device may further define a cavity configured to receive the aerosol-generating article. The electric heater of the aerosol-generating device may be configured to heat the aerosol-forming substrate when the aerosol-generating article is received within the cavity.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
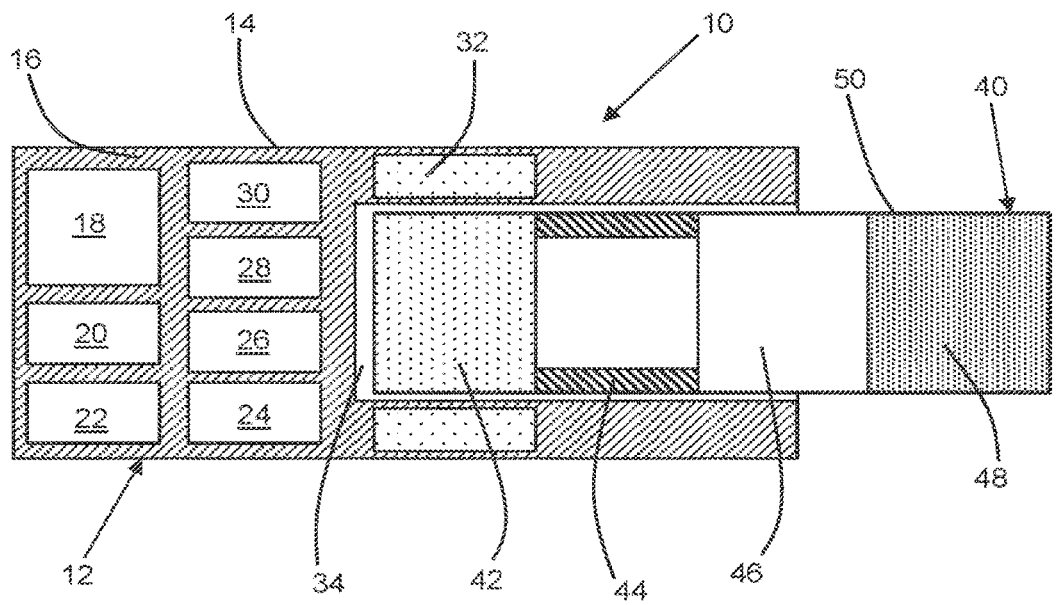
FIG. 1 shows an aerosol-generating system in accordance with an example embodiment.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

According to an example embodiment, an aerosol-generating device may comprise a housing defining at least one internal compartment. The housing may be waterproof (with regard to the at least one internal compartment). The aerosol-generating device may further comprise a power supply, an electric heater, and/or a haptic feedback device. Each of the power supply, electric heater, and/or haptic feedback device may be positioned within one or more of the at least one internal compartments.

The term "waterproof" is used herein to refer to a liquid ingress protection level of at least 6 when measured in accordance with IEC standard 60529. Thus, a housing that is waterproof will provide such a protection level against liquid ingress into the at least one internal compartment therein.

Additionally, the aerosol-generating devices may comprise a haptic feedback device. In an example embodiment, the aerosol-generating device comprises a waterproof housing defining the internal compartment in which the power supply or the electric heater, or both the power supply and the electric heater, are positioned. A waterproof housing improves the reliability of aerosol-generating devices when compared to known aerosol-generating devices by protecting the power supply and the heater from water damage. Using a haptic feedback device may facilitate waterproofing of the housing since the haptic feedback device can be entirely sealed within the housing. This is in contrast to known aerosol-generating devices, which typically use at least one of a light and a speaker to provide feedback. Lights and speakers typically require at least one opening in the housing to facilitate adequate transmission of light or sound through the housing to provide the desired feedback, which prevents waterproofing of the housing.

The aerosol-generating device may further comprise an input device positioned within the at least one internal compartment. Providing an input device may enable the control of one or more functions of the aerosol-generating device. The input device may enable the control of at least one of an activation of the electric heater, a deactivation of the electric heater, a duration of a heating cycle, an electronic locking of the device to prevent activation of the electric heater, an electronic unlocking of the device to permit activation of the electric heater, and combinations thereof. The aerosol-generating device may be configured to provide feedback via the haptic feedback device in response to an input via the input device.

In an example embodiment, the input device is positioned within the internal compartment so that the input device does not compromise the waterproofing of the housing. The input device may comprise at least one of a capacitive sensor, an electro-optical sensor, an accelerometer, a gyroscope, a magnetometer, and combinations thereof. Such input devices facilitate the positioning of the input device within the internal compartment. This is in contrast to push-button input devices used on known aerosol-generating devices, which may prevent or compromise the waterproofing of a housing. Typically, push-button input devices extend through an aperture in a housing, which may provide a route for moisture or other contaminants to directly enter the housing.

In example embodiments in which the input device comprises a capacitive sensor, the capacitive sensor may be positioned on an internal surface of the housing. Positioning the capacitive sensor on an internal surface may improve the sensitivity of the capacitive sensor to stimuli outside the housing. For example, positioning the capacitive sensor on an internal surface of the housing may facilitate detection of a digit or finger when positioned proximate to or against the external surface of the portion of the housing overlying the capacitive sensor. The portion of the housing overlying the capacitive sensor may have a reduced thickness compared to adjacent portions of the housing to optimize the sensitivity of the capacitive sensor. The housing may be provided with one or more indicia on the external surface of the housing to indicate the location of the capacitive sensor.

In example embodiments in which the input device comprises an electro-optical sensor, at least a portion of the housing may be substantially transparent to at least one wavelength of electromagnetic radiation to which the electro-optical sensor is sensitive.

In any of the example embodiments described herein, the haptic feedback device may comprise at least one of an eccentric rotating mass motor, a linear resonant actuator, and a piezoelectric device. Such haptic feedback devices may be relatively small with relatively low power requirements, and therefore particularly suitable for inclusion in aerosol-generating devices.

The housing may be hermetically sealed. The term "hermetically sealed" is used herein to refer to a liquid ingress protection level of at least 7 when measured in accordance with IEC standard 60529. An aerosol-generating device comprising a hermetically sealed housing may tolerate immersion in water without suffering water damage to the power supply, the haptic feedback device, the electric heater, and any other electrical components positioned within the at least one internal compartment.

In any of the example embodiments described herein, the electric heater may comprise at least one of a resistive heater and an inductive heater. For instance, the electric heater may be an inductive heater. An inductive heater positioned within the at least one internal compartment may be operated to heat an aerosol-generating article positioned outside of the at least one internal compartment without significant heating of the housing or other components of the aerosol-generating device.

The aerosol-generating device may define a cavity for receiving an aerosol-generating article. At least a portion of the at least one internal compartment may circumscribe at least a portion of the cavity. The electric heater may be an inductive heater circumscribing at least a portion of the cavity. The inductive heater may have a substantially annular shape.

In any of the example embodiments described herein, the aerosol-generating device may further comprise a wireless data connector positioned within the at least one internal compartment. A wireless data connector can facilitate data communication between the aerosol-generating device and an external device without compromising the waterproofing of the housing. The wireless data connector may be configured to transmit data from the aerosol-generating device, receive data from an external device, or transmit and receive data.

The wireless data connector may be configured to transmit operational data relating to the operation of the aerosol-generating device. For example, the operational data may include information relating to at least one of a number of activations of the electric heater, the total duration of operation of the electric heater, the number and type of aerosol-generating articles used with the aerosol-generating device, and a remaining power level within the power supply.

The wireless data connector may be configured to receive data relating to a software update. The wireless data connector may be configured for wireless communication using at least one wireless protocol selected from Near Field Communication, Bluetooth, ZigBee, Wi-Fi, and Ultra-wideband.

The aerosol-generating device may further comprise a data storage device. The data storage device may be configured to store operational data relating to the operation of the aerosol-generating device. The data storage device may be configured to store operational data prior to transmission of the operational data by the wireless data connector. The data storage device may be configured to store data received by the wireless data connector. The data storage device may be configured to store operational data prior to transmission by the wireless data connector and configured to store data received by the wireless data connector. The data storage device may comprise a flash memory data storage medium.

In any of the example embodiments described herein, the aerosol-generating device may further comprise a wireless power connector positioned within the at least one internal compartment. A wireless power connector may facilitate the transfer of electrical power between an external source of electrical power and the aerosol-generating device without compromising the waterproofing of the housing. The power supply may be rechargeable, and the wireless power connector may be configured to recharge the power supply using electrical power received inductively from an external source. The wireless power connector may be an inductive charging coil.

The power supply may be a battery, such as a rechargeable lithium ion battery. Alternatively, the power supply may be another form of charge storage device, such as a capacitor. The power supply may require recharging. The power supply may have a capacity that allows for the storage of enough energy for one or more experiences. For example, the power supply may have sufficient capacity to allow for the continuous generation of aerosol or vapor for a period of around six minutes (which may correspond to the average time to smoke a cigarette) or for a period that is a multiple of six minutes. In another example, the power supply may have sufficient capacity to allow for a predetermined or desired number of applications of negative pressure or discrete activations of the electric heater.

In any of the example embodiments described herein, the aerosol-generating device may further comprise a controller positioned within the at least one internal compartment. The controller may be configured to control at least one of the power supply, the haptic feedback device, and the electric heater. When present, at least one of the input device, the wireless data connector, and the wireless power connector may be controlled by the controller.

The housing may have an elongated form. The housing may comprise any suitable material or combination of materials. Examples of suitable materials include metals, alloys, plastics, or composite materials containing one or more of those materials, or thermoplastics that are suitable for food or pharmaceutical applications, for example, polypropylene, polyetheretherketone (PEEK), and polyethylene. In an example embodiment, the material is light and non-brittle.

The aerosol-generating device may be portable. The aerosol-generating device may have a size comparable to a cigar or cigarette. The aerosol-generating device may have a total length between approximately 30 mm and approximately 150 mm. The aerosol-generating device may have an external diameter between approximately 5 mm and approximately 30 mm.

An aerosol-generating system may comprise an aerosol-generating article and an aerosol-generating device in accordance with any of the example embodiments described herein.

The aerosol-generating article comprises an aerosol-forming substrate that is heated by the electric heater of the aerosol-generating device. The aerosol-forming substrate or pre-vapor formulation may be a liquid, solid, and/or gel formulation including, but not limited to, water, beads, solvents, active ingredients, ethanol, plant extracts, natural or artificial flavors, and/or vapor formers such as glycerine and propylene glycol.

The electric heater may indirectly heat the aerosol-forming substrate. The electric heater may be an inductive heater, and the aerosol-generating article may further comprise a susceptor in thermal communication with the aerosol-forming substrate. The susceptor is heated by the inductive heater, and the aerosol-forming substrate is heated by the susceptor. The susceptor may be configured to heat the aerosol-forming substrate by at least one of conductive heat transfer, convective heat transfer, radiative heat transfer, and combinations thereof.

The housing of the aerosol-generating device may define a cavity for receiving the aerosol-generating article. The aerosol-generating article may comprise a liquid storage portion and a liquid aerosol-forming substrate stored within the liquid storage portion. The electric heater heats a small portion of the liquid aerosol-forming substrate in order to vaporize the small portion of the liquid aerosol-forming substrate. The liquid aerosol-forming substrate may comprise a tobacco-containing material comprising volatile tobacco flavour compounds which are released from the liquid upon heating. Alternatively, or in addition, the liquid aerosol-forming substrate may comprise a non-tobacco material. The liquid aerosol-forming substrate may include water, solvents, ethanol, plant extracts, and natural or artificial flavours. The liquid aerosol-forming substrate may further comprise an aerosol former.

As used herein, the term "aerosol former" is used to describe any suitable known compound or mixture of compounds that facilitate the formation of an aerosol or vapor. Suitable aerosol formers are substantially resistant to thermal degradation at the operating temperature of the aerosol-generating article. Examples of suitable aerosol formers are glycerine and propylene glycol.

The aerosol-generating system may further comprise a capillary wick in communication with the liquid storage portion. The capillary wick is arranged to be in contact with the liquid aerosol-forming substrate within the liquid storage portion. The liquid aerosol-forming substrate is transferred from the liquid storage portion along the capillary wick by capillary action, where it is heated by the electric heater. In example embodiments in which the electric heater comprises an inductive heater, the aerosol-generating system may further comprise a susceptor. The inductive heater heats the susceptor, and the liquid aerosol-forming substrate is transferred from the liquid storage portion to the susceptor via the capillary wick.

The aerosol-generating article may comprise a solid aerosol-forming substrate. The aerosol-forming substrate may comprise tobacco. The aerosol-forming substrate may comprise a tobacco-containing material containing volatile tobacco flavour compounds which are released from the substrate upon heating. The aerosol-forming substrate may comprise a non-tobacco material. The aerosol-forming substrate may also comprise tobacco-containing material and non-tobacco containing material.

The aerosol-forming substrate may include at least one aerosol former. Suitable aerosol formers include, but are not limited to, polyhydric alcohols, such as propylene glycol, triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate The aerosol-forming substrate may comprise a single aerosol former. Alternatively, the aerosol-forming substrate may comprise a combination of two or more aerosol formers.

The aerosol-forming substrate may have an aerosol former content of greater than 5 percent on a dry weight basis. For example, the aerosol-forming substrate may have an aerosol former content of between approximately 5 percent and approximately 30 percent on a dry weight basis. In a non-limiting embodiment, the aerosol-forming substrate may have an aerosol former content of approximately 20 percent on a dry weight basis.

The aerosol-generating article may comprise an aerosol-forming substrate comprising a first aerosol-forming substrate comprising a nicotine source and a second aerosol-forming substrate comprising an acid source. The electric heater heats the first and second aerosol-forming substrates to volatilize the nicotine and the acid so that the nicotine and acid are reacted together in the gas phase to form an aerosol of nicotine salt particles.

The nicotine source may comprise one or more of nicotine, nicotine base, a nicotine salt, such as nicotine-HCl, nicotine-tartrate, or nicotine-ditartrate, or a nicotine derivative.

The nicotine source may comprise natural nicotine or synthetic nicotine.

The nicotine source may comprise pure nicotine, a solution of nicotine in an aqueous or non-aqueous solvent, or a liquid tobacco extract.

The nicotine source may further comprise an electrolyte forming compound. The electrolyte forming compound may be selected from the group consisting of alkali metal hydroxides, alkali metal oxides, alkali metal salts, alkaline earth metal oxides, alkaline earth metal hydroxides, and combinations thereof.

For example, the nicotine source may comprise an electrolyte forming compound selected from the group consisting of potassium hydroxide, sodium hydroxide, lithium oxide, barium oxide, potassium chloride, sodium chloride, sodium carbonate, sodium citrate, ammonium sulfate, and combinations thereof.

In non-limiting embodiments, the nicotine source may comprise an aqueous solution of nicotine, nicotine base, a nicotine salt, or a nicotine derivative, and an electrolyte forming compound. The nicotine source may further comprise other components including, but not limited to, natural flavours, artificial flavours, and antioxidants.

The acid source may comprise an organic acid or an inorganic acid. The organic acid may include a carboxylic acid, e.g., lactic acid or an alpha-keto or 2-oxo acid. In an example embodiment, the acid source may comprise an acid selected from the group consisting of lactic acid, 3-methyl-2-oxopentanoic acid, pyruvic acid, 2-oxopentanoic acid, 4-methyl-2-oxopentanoic acid, 3-methyl-2-oxobutanoic acid, 2-oxooctanoic acid, and combinations thereof.

FIG. 1 shows an aerosol-generating system 10 in accordance with an example embodiment. The aerosol-generating system 10 comprises an aerosol-generating device 12 comprising a housing 14 defining at least one internal compartment 16. The housing 14, and therefore the at least one internal compartment 16, are waterproof.

The aerosol-generating device 12 comprises a power supply 18, a wireless power connector 20, a wireless data connector 22, a data storage device 24, a haptic feedback device 26, a controller 28, an input device 30, and an electric heater 32, all positioned within the internal compartment 16. The controller 28 controls a supply of electrical power from the power supply 18 to the other electrical components positioned within the internal compartment 16. The electric heater 32 is an annular inductive heater.

The aerosol-generating system 10 further comprises an aerosol-generating article 40 that is received within a cavity 34 of the aerosol-generating device 12. The aerosol-generating article 40 comprises an aerosol-forming substrate 42, a hollow acetate tube 44, a polymeric filter 46, a mouthpiece 48, and an outer wrapper 50. The aerosol-forming substrate 42 comprises a susceptor dispersed within a plug of tobacco and the mouthpiece 48 comprises a plug of cellulose acetate fibres.

The controller 28 supplies electrical current from the power supply 18 to the electric heater 32 to inductively heat the susceptor within the aerosol-forming substrate 42. As the susceptor is heated, the tobacco within the aerosol-forming substrate 42 is heated and volatile compounds are released from the tobacco. Electrical current is supplied from the power supply 18 to the haptic feedback device 26 to provide haptic feedback to indicate the start and finish of a heating cycle.

Figure 2:
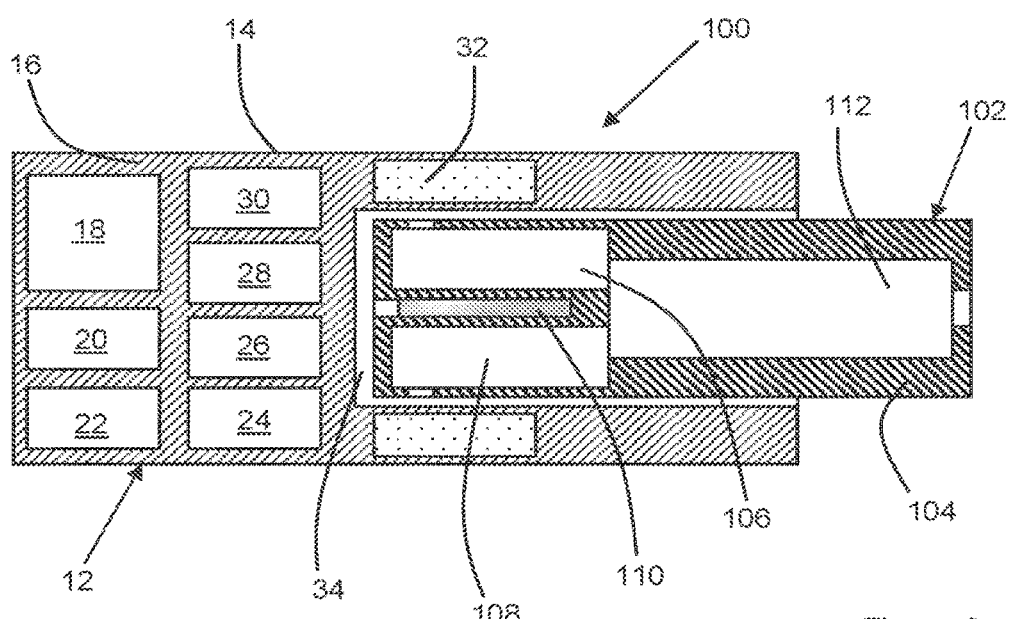
FIG. 2 shows an aerosol-generating system in accordance with another example embodiment.

FIG. 2 shows an alternative aerosol-generating system 100 according to an example embodiment. The aerosol-generating system 100 comprises an aerosol-generating device 12 that is identical to the aerosol-generating device 12 described with reference to FIG. 1. Therefore, like reference numerals are used to designate like parts, and the functions of both aerosol-generating devices 12 are the same and have not been repeated in the interest of brevity.

The aerosol-generating system 100 shown in FIG. 2 comprises an aerosol-generating article 102 comprising a cartridge 104 defining a first compartment 106 containing a nicotine source and a second compartment 108 containing an acid source. The nicotine source may comprise a sorption element, such as a PTFE wick, with nicotine adsorbed thereon. The acid source may comprise a sorption element, such as a PTFE wick, with acid adsorbed thereon. The acid may be, for example, lactic acid.

The aerosol-generating article 102 further comprises a susceptor 110 positioned between the first and second compartments 106, 108. The aerosol-generating article 102 further comprises a third compartment 112 positioned downstream of the first and second compartments 106, 108. The third compartment 112 is in fluid communication with the first and second compartments 106, 108.

The controller 28 supplies electrical current from the power supply 18 to the electric heater 32 to inductively heat the susceptor 110 within the aerosol-generating article 102. Heating of the susceptor 110 heats the first and second compartments 106, 108, which volatilizes the nicotine and the acid within the first and second compartments respectively. The nicotine and acid vapors mix within the third compartment 112 and react to form an aerosol comprising nicotine salt particles. Electrical current is supplied from the power supply 18 to the haptic feedback device 26 to provide haptic feedback to indicate the start and finish of a heating cycle.

Figure 3:
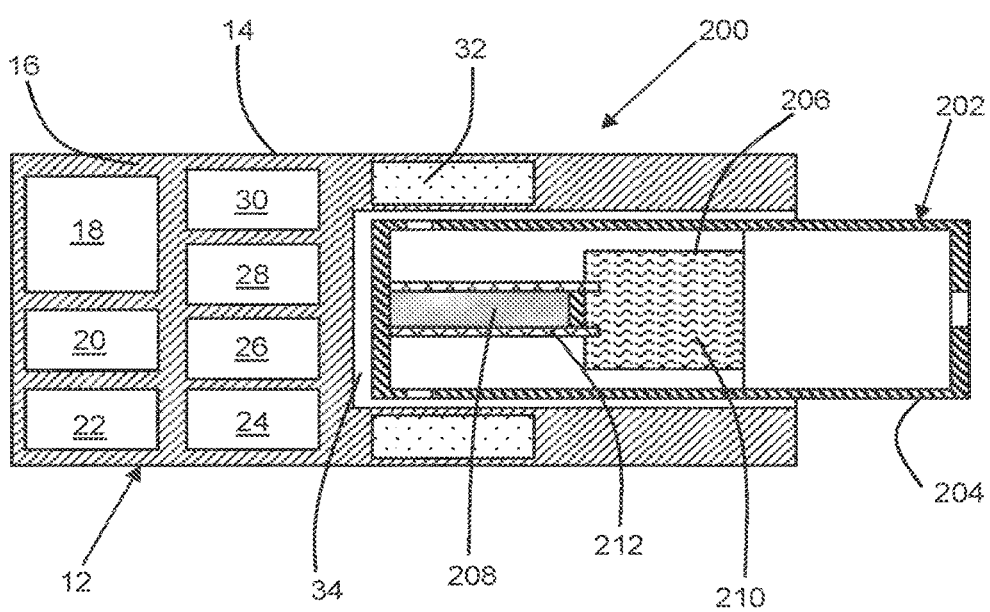
FIG. 3 shows an aerosol-generating system in accordance with another example embodiment.

FIG. 3 shows an alternative aerosol-generating system 200 according to an example embodiment. The aerosol-generating system 200 comprises an aerosol-generating device 12 that is identical to the aerosol-generating device 12 described with reference to FIGS. 1 and 2. Therefore, like reference numerals are used to designate like parts and the function of each aerosol-generating device 12 is the same and has not been repeated in the interest of brevity.

The aerosol-generating system 200 shown in FIG. 3 comprises an aerosol-generating article 202 comprising a cartridge 204 housing a liquid storage portion 206 and a susceptor 208. A liquid aerosol-forming substrate 210 is stored within the liquid storage portion 206 and a capillary wick 212 extends between the liquid storage portion 206 and the susceptor 208. The capillary wick 212 substantially surrounds the susceptor 208.

The liquid aerosol-forming substrate 210 is transferred by capillary action along the capillary wick 212 from the liquid storage portion 206 to the susceptor 208. The controller 28 supplies electrical current from the power supply 18 to the electric heater 32 to inductively heat the susceptor 208 within the aerosol-generating article 202. Heating of the susceptor 208 heats and volatilizes the liquid aerosol-forming substrate 210 from the capillary wick 212. Electrical current is supplied from the power supply 18 to the haptic feedback device 26 to provide haptic feedback to indicate the start and finish of a heating cycle.

While a number of example embodiments have been disclosed herein, it should be understood that other variations may be possible. For instance, one of more features from one embodiment may be applicable to and implemented in other embodiments. Such variations are not to be regarded as a departure from the spirit and scope of the present disclosure, and all such modifications as would be obvious to one skilled in the art are intended to be included within the scope of the following claims.

The invention claimed is:

1. An aerosol-generating device comprising:
   a housing defining a cavity at a first longitudinal end of the housing;
   a heater within the housing defining the cavity, and the heater outside of and surrounding a portion of the cavity; and
   a plurality of internal components within the housing at a second longitudinal end of the housing.

2. The aerosol-generating device according to claim 1, wherein the plurality of internal components include a power supply.

3. The aerosol-generating device according to claim 2, wherein the housing includes a plurality of waterproof compartments.

4. The aerosol-generating device according to claim 3, wherein the power supply and the heater are both positioned within a same one of the plurality of waterproof compartments.

5. The aerosol-generating device according to claim 3, further comprising:
   an input device positioned within the plurality of waterproof compartments.

6. The aerosol-generating device according to claim 5, wherein the input device includes at least one of a capacitive sensor, an electro-optical sensor, an accelerometer, a gyroscope, and a magnetometer.

7. The aerosol-generating device according to claim 3, further comprising:
   a haptic feedback device positioned within one of the plurality of waterproof compartments.

8. The aerosol-generating device according to claim 7, wherein the haptic feedback device includes at least one of an eccentric rotating mass motor, a linear resonant actuator, and a piezoelectric device.

9. The aerosol-generating device according to claim 2, wherein the heater is an inductive heater.

10. The aerosol-generating device according to claim 3, further comprising:
    a wireless data connector positioned within one of the plurality of waterproof compartments.

11. The aerosol-generating device according to claim 10, wherein the wireless data connector is configured for wireless communication using at least one wireless protocol selected from Near Field Communication, Bluetooth, ZigBee, Wi-Fi, and Ultra-wideband.

12. The aerosol-generating device according to claim 3, further comprising:
    a wireless power connector positioned within one of the plurality of waterproof compartments.

13. The aerosol-generating device according to claim 12, wherein the power supply is rechargeable, and the wireless power connector is an inductive charging coil configured to recharge the power supply using electrical power received inductively from an external source.

14. An aerosol-generating system comprising:
    an aerosol-generating device including,
       a housing defining a cavity,
       a heater within the housing defining the cavity, and the heater outside of and surrounding a portion of the cavity, and
       a plurality of internal compartments within the housing which are separated from the cavity; and
    an aerosol-generating article including a liquid storage portion and a liquid aerosol-forming substrate within the liquid storage portion, the heater of the aerosol-generating device configured to heat the liquid aerosol-forming substrate during an operation of the aerosol-generating system, the aerosol-generating article configured to be insertable into the cavity of the housing.

15. An aerosol-generating system comprising:
    an aerosol-generating article including an aerosol-forming substrate; and
    an aerosol-generating device including,
       a housing defining a cavity, a heater within the housing defining the cavity, and the heater outside of and surrounding a portion of the cavity, and a plurality of internal compartments within the housing which are separated from the cavity, wherein the aerosol-generating article is configured to be insertable into the cavity of the housing, the heater of the aerosol-generating device configured to heat the aerosol-forming substrate when the aerosol-generating article is received within the cavity.

16. The aerosol-generating system according to claim 15, wherein the aerosol-forming substrate includes tobacco.

17. The aerosol-generating system according to claim 15, wherein the aerosol-forming substrate includes a first aerosol-forming substrate including a nicotine source and a second aerosol-forming substrate including an acid source.

* * * * *